United States Patent Office 3,290,162
Patented Dec. 6, 1966

3,290,162
WATERPROOFING LEATHER
Heinz Röhling and Eva Schönekerl, Leverkusen, and Gustav Mauthe, Opladen, Germany, assignors to Farbenfabriken Bayer Aktiengesellschaft, Leverkusen, Germany, a German corporation
No Drawing. Filed Oct. 31, 1962, Ser. No. 234,546
Claims priority, application Germany, Nov. 3, 1961, F 35,279
9 Claims. (Cl. 106—287)

This invention relates to waterproofing leather and more particularly to waterproofed leather prepared from emulsions containing organic isocyanates.

It has been proposed heretofore to waterproof textiles and the like with organic isocyanates. Indeed, the waterproofing of textiles and the like was one of the first uses for organic isocyanates. As long ago as 1937, a patent was applied for (U.S. Patent 2,284,895) which related to the use of aliphatic isocyanates or isocyanatothiocyanates containing an hydrocarbon radical of at least 8 carbon atoms for the purpose of imparting water repellency to textiles. In order to avoid the use of expensive solvents, the patentee proposed to use an aqueous emulsion employing ordinary household or laundry soap as the emulsifying agent. These emulsions worked satisfactorily for many types of fabric but they are not stable enough for the production of waterproofed leather and produce a leather product which is difficult to vulcanize.

It is therefore an object of this invention to provide aqueous emulsions of organic isocyanates which are suitable for the preparation of waterproofed leather and which are more stable than heretofore known aqueous emulsions of isocyanates. Another object of this invention is to provide an improved leather waterproofing composition based on organic isocyanates. Still another object of this invention is to provide leather which is waterproofed and which has improved vulcanizable properties. Still a further object of the invention is to provide soft and supple water repellent leather which nevertheless has a dry feeling hand. Still another object of the invention is to provide a waterproofed leather which in addition to having good water repellency can be vulcanized to rubber. A further object of the invention is to provide an improved cow leather upper which may be vulcanized to rubber soles to provide an improved bond between the upper and the sole of rubber-soled shoes.

The foregoing objects and others which will become apparent from the following description are accomplished in accordance with the invention, generally speaking, by providing an aqueous emulsion of an organic isocyanate, said organic isocyanate containing at least one lipophilic radical and being emulsified with an emulsifier containing sulphamido and/or sulphimido groups bonded to a higher aliphatic radical, methods of waterproofing leather therewith and waterproofed leather thus obtained. Suitable proportions of the components involved can be readily determined by preliminary experiments; in general, about 2–10 parts by weight of the organic isocyanates in the form of a 2–25% aqueous emulsion are used for 100 parts by weight of leather; the required amount of emulsifier naturally depends on the chain length of the lipophilic radical of the organic isocyanate to be emulsified and amounts in general to about 10–100 percent by weight, calculated on the organic isocyanate. And, of course, the invention also contemplates an improved waterproofed leather obtained by this method which is outstandingly water repellent, soft and supple and has a dry feeling hand. Moreover, the improved leather of the invention is readily vulcanizable to rubber.

Any suitable organic isocyanate containing a lipophilic radical may be used. The term "lipophilic radical" as used herein refers to an organic radical and preferably an aliphatic hydrocarbon radical. The lipophilic radical may be connected to the isocyanate radical through other organic radicals including aromatic radicals such as phenyl. Particular isocyanates therefore within the scope of the invention are those which preferably have at least one radical containing at least 10 carbon atoms in a chain as the lipophilic radical such as, for example, dodecyl isocyanate, stearyl isocyanate, undecyl isocyanate, octadecyl isocyanate, dodecyl phenyl isocyanate, stearyl phenyl isocyanate, heneicosyl isocyanate and the like. It is preferred to use organic isocyanates which contain only one free isocyanato group and no group which is reactive therewith.

Any suitable emulsifier which contains sulphamido and/or sulphimido groups may be used in accordance with the process of the invention. It is preferred to use those sulphamido and/or sulphimido compounds which have aliphatic radicals containing from 10 to 22 carbon atoms. These compounds may be prepared by well known methods wherein an alkane or substituted alkane sulphonyl chloride is reacted with ammonia in accordance with the following equations:

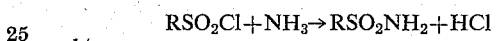
$$RSO_2Cl + NH_3 \rightarrow RSO_2NH_2 + HCl$$

and/or

$$2RSO_2Cl + NH_3 \rightarrow RSO_2NHOSOR + 2HCl$$

For the purposes of this invention, R in the formula may be any suitable aliphatic radical which preferably contains from about 10 to about 22 carbon atoms. Both saturated and unsaturated, substituted and unsubstituted radicals are coontemplated. It is preferred to use saturated aliphatic hydrocarbons and more particularly those fractions boiling within the range of from about 200° C. to about 350° C. or halohydrocarbons derived therefrom. Thus, suitable alkanes on which to base the sulphamido and/or sulphimido compounds of the invention are dodecane, tridecane, tetradecane, pentadecane, hexadecane, heptadecane, octadecane, nonadecane, eicosane, heneicosane and docosane. Of course, these compounds only form the radical R in the foregoing formulas and may be chlorinated such as, for example, 1-chlorodecyl, 2,6-dichlorooctadecyl and the like. Specific examples are dodecyl sulphamide, didodecyl sulphimide, 1-sulphamido hexadecane, heptadecyl octadecyl sulphimide and the like compounds based on the alkanes and substituted alkanes set forth above. A perfectly satisfactory and, in fact preferred, mixture of hydrocarbons is a high boiling (200 to 350° C.) kerosene which contains up to 35 percent (preferably 15 to 25 percent) by weight of chemically combined chlorine. The amount of the sulphamido and/or sulphimido compound used to emulsify the organic isocyanate depends on the chain length of the lipophilic radical of the organic isocyanate. But, amounts within the range of from about 10 to about 100 percent by weight of the organic isocyanate are generally suitable. The sulphamido and/or sulphimido compounds may also be prepared by reacting aliphatic sulphochlorides with organic ammonia derivatives containing basic primary or secondary amino groups such as, for example, ethyl amine, methyl ethyl amine and the like and according to the process of German Patent 767,853. It is preferred to thoroughly mix the emulsifier with the isocyanate and then add water to the mixture to obtain the most stable emulsions.

Any suitable leather may be used such as, for example, the leathers obtained by the well known processes wherein chrome tanning agents, vegetable tanning agents or synthetic tanning agents are applied. In these processes, skins or hides such as goat skin, sheep skin, pigskin, calve skin, cowhide, horse hide and the like are first trimmed and then washed and soaked in water, treated to remove the hair and after bating and pickling, are tanned. This invention begins with a tanned leather and while the waterproofing method of the invention is applicable to leather tanned by any of the known tanning processes, it especially applies to leather which has been pretanned by the chrome process and after-tanned by a process wherein vegetable or synthetic tanning agents are applied. The leather obtained by such tanning process gives the best waterproofing action with the emulsions of the invention.

The emulsions of the invention produce leather which has outstanding water repellency, which is soft and supple and which has a desirable dry feeling hand. Moreover, the leather treated according to the invention is easily vulcanized to rubber such as the Neoprene rubber used to make shoe soles, shoe heels and the like.

The invention is further illustrated by the following example in which the parts are by weight unless otherwise indicated.

*Example 1*

About 100 parts of faded strongly vegetable after-tanned upper cow leather are fulled in a tanning vessel at room temperature with about 16.5 parts of an emulsion prepared from about 3 parts of stearyl isocyanate, about 1 part of the emulsifier described below and about 12.5 parts of water. The leather is then allowed to settle for about 72 hours, shaken out, dried by hanging at room temperature and finally dressed in the usual way. The leather so obtained is outstandingly waterproof. Moreover, it is water repellent, soft and supple, shows a dry feel and light color. Rubber soles can be vulcanized on without disadvantageous influence on the leather.

On the Bally Penetrometer, the leather shows a water take-up of only 3 to 5 percent by weight and the number of bends to water penetration runs to over 5000. These values are considerably better than the values obtained if such aqueous emulsions of organic isocyanates containing a lipophilic radical are used, for the preparation of which the usual emulsifiers of the types of alkyl sulphates, alkyl sulphonates, or fatty alcohol polyglycol ethers are applied.

The emulsifier employed was produced in the following manner: A mixture of aliphatic hydrocarbons (kerosene) within a boiling range of from about 200° C. to about 350° C. was first chlorinated to a chlorine content of about 25 percent by weight and then sulphochlorinated in the usual way with chlorine and sulphur dioxide to about 25 percent by weight. The reaction mixture was then reacted with aqueous ammonia. After separating the aqueous layer, the remaining oily layer containing the sulphamido and/or sulphimido compounds carrying higher aliphatic radicals was purified by filtration.

*Example 2*

The procedure of Example 1 is followed with the difference that the emulsifier used was purified in the following manner:

The filtrated oily layer obtained according to the last paragraph of Example 1 was shaken with methanol for 7 hours at room temperature. The methanol layer was separated, the solvent was distilled off, the residue was stirred with chloroform for 3 hours, the chloroform layer was separated and the solvent was distilled off.

The leather treated with the emulsion prepared with the purified emulsifier shows the same properties as the leather treated according to Example 1. The emulsion however is more stable. It is to be understood that any other suitable leather, organic isocyanate, emulsifying agent containing sulphamido and/or sulphimido groups could have been used in the working examples if the teachings of the disclosure are followed. This is further illustrated by the following table; the parts are parts by weight and refer to 100 parts of the leather.

TABLE

| Leather | Organic isocyanate | Parts | Emulsifier | Parts |
| --- | --- | --- | --- | --- |
| Faded strongly vegetable after-tanned upper cow leather. | Hexadecyl isocyanate. | 5 | As described in Example 1. | 1.5 |
| Do. | Dodecyl phenyl isocyanate. | 5 | ____do____ | 2.3 |
| Sheep skins pretanned by the chrome process and after-tanned with vegetable tanning agents. | Octadecyl isocyanate. | 6 | As described in Example 2. | 1.2 |
| Calfskin pretanned with synthetic tanning agents and after-tanned by the chrome process. | Tetradecyl isocyanate. | 4 | ____do____ | 1 |

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of waterproofing leather which comprises treating tanned leather with an aqueous emulsion of an organic isocyanate containing at least one lipophilic radical containing at least 10 carbon atoms in a chain, said organic isocyanate being employed in an amount of from about 2 to about 10% by weight based on the weight of the leather and being emulsified with 10 to 100% by weight based on the weight of said organic isocyanate of an emulsifier containing groups selected from the class consisting of sulphamido and sulphimido groups bonded to a higher aliphatic radical of 10 to 22 carbon atoms.

2. The method of claim 1 wherein said leather is cow leather.

3. The method of claim 1 wherein said isocyanate is stearyl isocyanate.

4. The method of claim 2 wherein said emulsifier is prepared by a process which comprises reacting kerosene first with chlorine until it contains up to about 35 percent by weight of chemically combined chlorine, subsequently reacting said chlorinated kerosene with additional chlorine and sulphur dioxide until said kerosene contains up to about 25 percent by weight of sulphonyl chloride and thereafter reacting said sulphonyl chloride with aqueous ammonia to prepare a chlorinated kerosene containing sulphamido and sulphimido groups.

5. The method of claim 4 wherein said kerosene has a boiling point within the range of from about 200 to about 350° C.

6. An aqueous emulsion of an organic isocyanate suitable for waterproofing tanned leather which comprises a major proportion of a mixture of water, an organic isocyanate containing at least one lipophilic radical containing at least 10 carbon atoms in a chain and from about 10 to about 100 percent by weight of the amount of said organic isocyanate of an emulsifier containing groups selected from the class consisting of sulphamido and sulphimido groups bonded to an aliphatic radical having 10 to 22 carbon atoms.

7. The emulsion of claim 6 wherein said organic isocyanate is present in an amount of from about 2 to about 25 parts by weight.

8. The emulsion of claim 6 wherein said organic isocyanate is stearyl isocyanate and said emulsifier is kerosene containing sulphamido and sulphimido groups.

9. The leather obtained by the method of claim 1.

No references cited.

MORRIS LIEBMAN, *Primary Examiner.*

A. LIEBERMAN, *Assistant Examiner.*